Dec. 25, 1962  R. D. COLCHAGOFF ET AL  3,069,860
GLASS FORMING MACHINE

Filed Jan. 9, 1961  6 Sheets-Sheet 1

INVENTORS
ROBERT D. COLCHAGOFF
URBAN P. TRUDEAU
BY
D. T. Innis
and
J. R. Nelson
ATTORNEYS INVENTORS
ROBERT D. COLCHAGOFF
URBAN P. TRUDEAU
BY
D. T. Innis
and
J. R. Nelson
ATTORNEYS

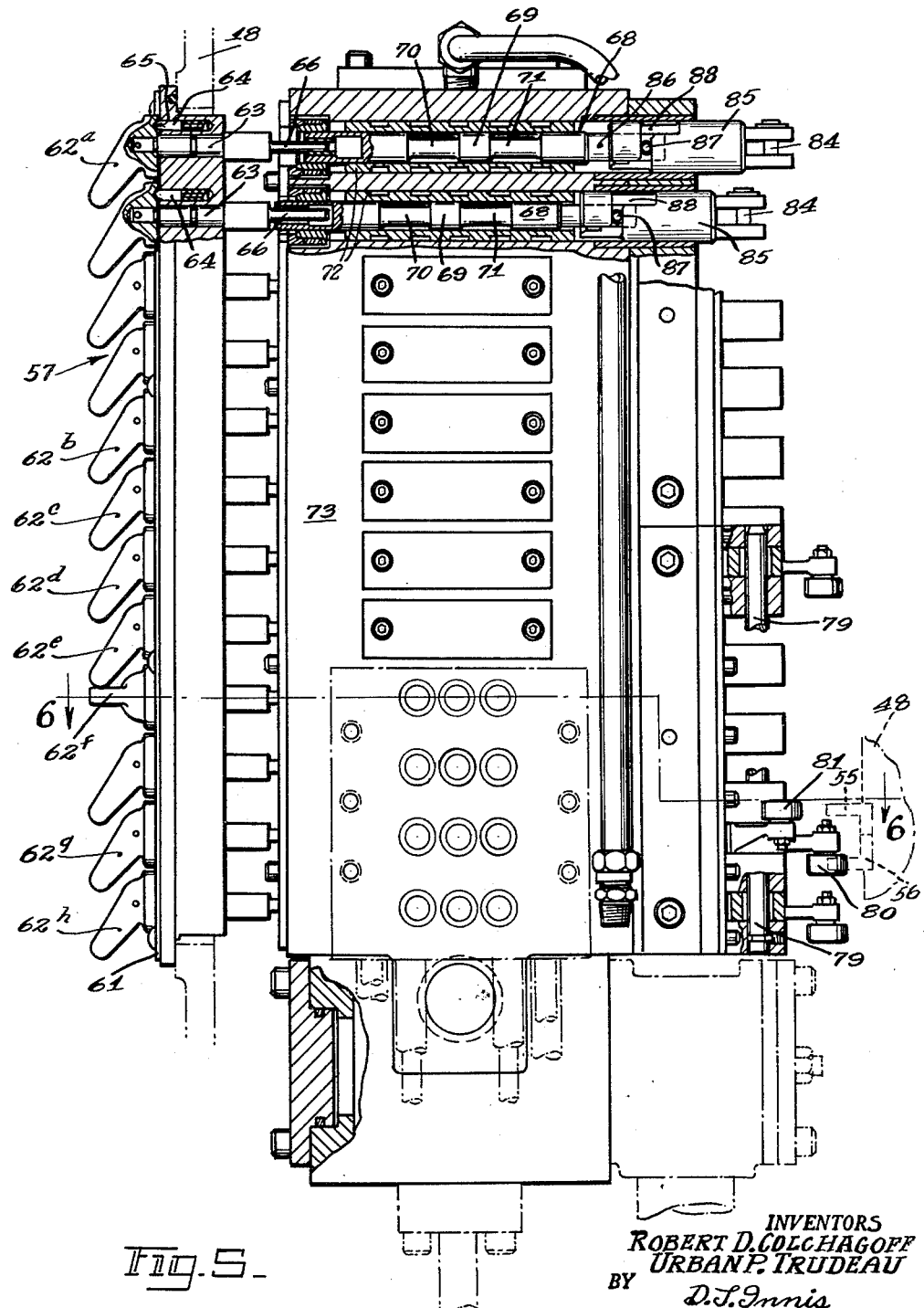

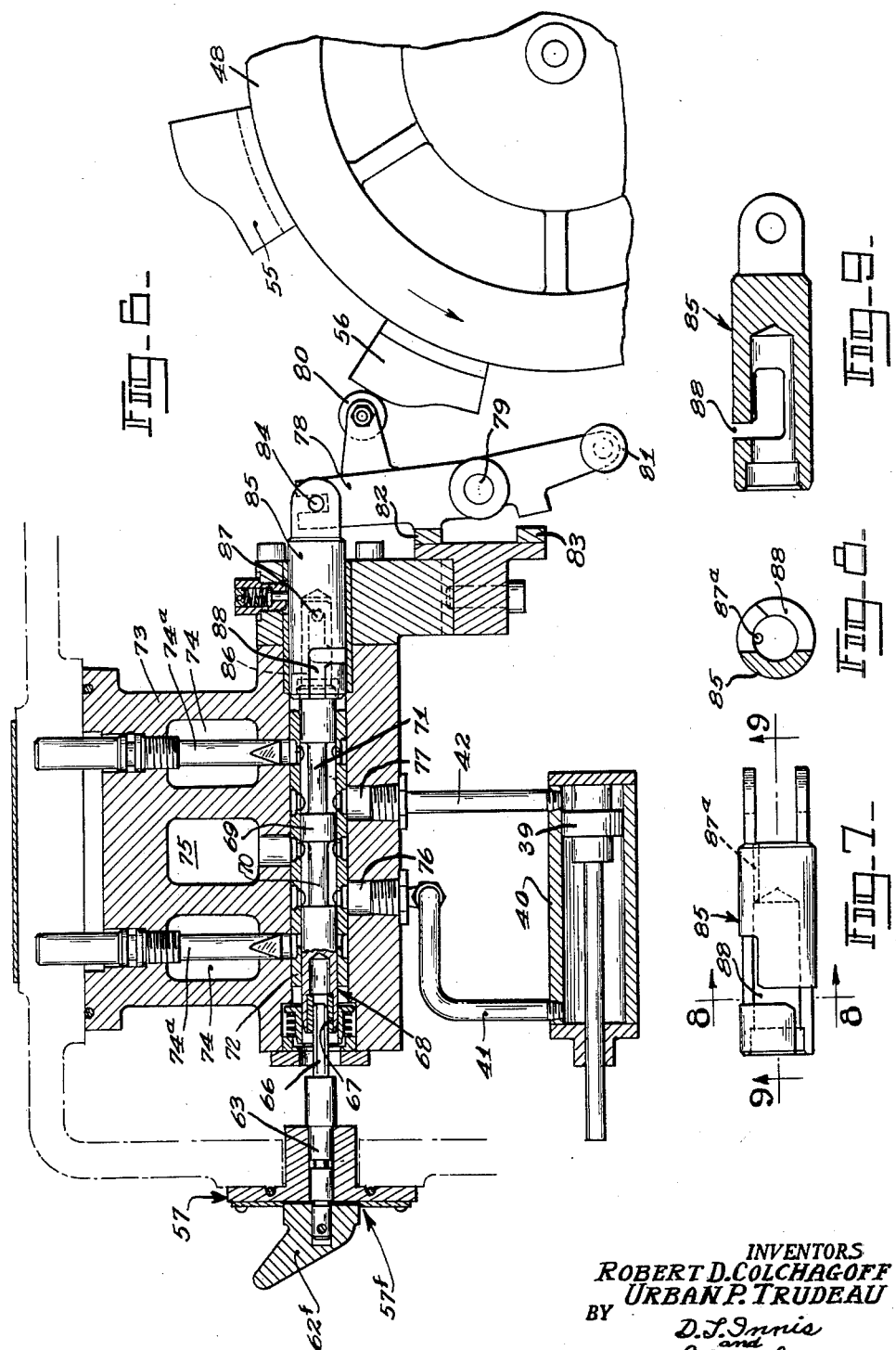

ns
Patented Dec. 25, 1962

3,069,860
GLASS FORMING MACHINE
Robert D. Colchagoff, Holland, and Urban P. Trudeau, Toledo, Ohio, assignors to Owens-Illinois Glass Company, a corporation of Ohio
Filed Jan. 9, 1961, Ser. No. 81,417
8 Claims. (Cl. 60—97)

The present invention relates to glass forming and shaping mechanisms and in particular a mechanism for controlling the cyclical operation of the hydraulically operated forming mechanisms of the machine.

This invention also relates to an organization of mechanical units of a glass molding machine and in particular to an organization in a plural cavity type of machine which will permit the simultaneous efficient forming of a plurality of glass containers.

In present day machines of the gob fed type, it is the usual procedure to charge the parison mold by one of two methods: (1) deliver the gob to the mold at the station preceding the pressing thereof or (2) by charging the mold at the pressing station with a side or deflected delivery of the gob to the mold. The inherent difficulty experienced with the first method is that the gob must rest in physical contact with the walls of the mold for an undue period of time and is therefore subjected to an excessive detrimental chill prior to the pressing. In the second method the plunger is above and in alignment with the mold cavity at the time of delivery of the gob to the mold thus requiring a side or deflected delivery of the charge to the mold. Furthermore, a deflected delivery of the gobs will cause unequal chilling and also an uncontrolled collapsing of the gobs in the mold in such manner as to trap air and chilled skin portions which will not disappear during the pressing operation and which will inherently result in detrimental marks in the finished ware.

In the present invention the charges or gobs of molten glass are delivered to the parison mold at the pressing station through a main gob guide system which always remains in vertical alignment with the vertical axis of the mold cavities thus insuring accurate central delivery of the gobs to the mold cavities. Once the charges have been delivered to the mold they will be immediately pressed into shape by bringing the plungers into vertical alignment and moving them downward through the neck molds and into the cavities.

There are a plurality of hydraulically actuated mechanisms provided on the forming machine of the invention. The hydraulic mechanisms are controlled in relation to their sequence of operation by the rotation of a cam carrying drum in which the cams are engageable with spool valves utilized to control the application of fluid under pressure to the hydraulic mechanisms. It is the usual procedure when it is necessary to repair or replace operating parts on a glass forming machine, to shut down the entire machine, make the repairs, and then restart the machine.

In the present invention, selective ones of the plural hydraulic mechanisms may be stopped in either extreme of operation while allowing the other mechanisms to continue to operate in their normal manner. The particular arrangement for stopping one of the mechanisms while allowing the other mechanism to continue to operate, is such that the particular hydraulically actuated mechanism which is to be stopped, will be stopped at the time and in sequence with its normal operation to the stop position. Furthermore, when the mechanism is again to be put into normal operation the mechanism of the invention will allow this hydraulically actuated mechanism to be started only when the other operating parts of the machine are relatively positioned so that the mechanism being started or actuated from its stopped position will start in its proper and normal sequence.

Therefore, it is an object of this invention to provide a novel timing control for a glass forming machine.

It is an additional object of this invention to provide mechanism for controlling a fluid operated glass forming machine in which operating parts of the machine may be selectively positioned out of operation without disturbing other operating mechanisms.

It is a further object of this invention to provide means for selectively connecting axially shiftable spool valves to their actuators whereby said valves are shifted between extreme positions each cycle of the machine or are shifted and remain in either extreme position.

It is a still further object of this invention to provide means for selectively starting and stopping the hydraulically operated mechanisms on a forming machine in sequence with their normal operating cycle.

Other and further objects will be apparent from the following description taken in conjunction with the annexed drawings wherein:

FIG. 5 is a partial sectional view taken at line 5—5 on FIG. 4;

FIG. 6 is a cross sectional view taken at line 6—6 on FIG. 5;

FIG. 7 is an elevational view of the connecting means between the cam follower and the spool valve;

FIG. 8 is a cross sectional view taken at line 8—8 on FIG. 7; and

FIG. 9 is a cross sectional view taken at line 9—9 on FIG. 7.

Figure 1:
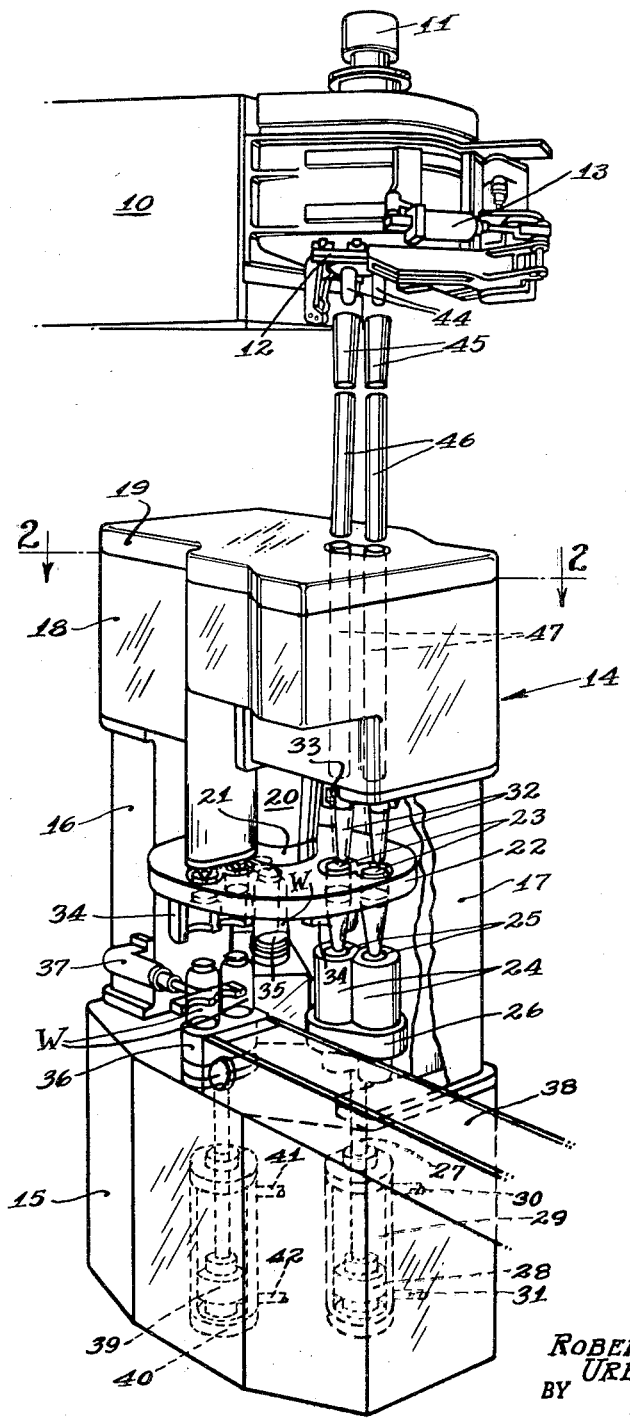
FIG. 1 is a perspective view in elevation of the machine unit embodying the invention.

With reference to the drawings and in particular to FIG. 1 thereof, there is illustrated a conventional feeder 10 having a reciprocating plunger 11, a double blade cutting shear 12 and a shear actuating cylinder 13. Beneath the feeder 10 is positioned a forming machine generally designated 14. The forming machine is comprised of a base 15, vertical uprights 16 and 17 upon which is mounted an upper structure support member 18 having a covering cap member 19 positioned thereover. Extending downwardly from the support member 18 is a vertically disposed bearing bracket 20 arranged to support a vertically disposed drive shaft 21 upon the lower end of which is mounted a neck mold carrying turret 22. This turret carries or supports a plurality of sets of neck molds 23, each set being equally spaced circumferentially of the turret. The turret is arranged to transport these neck molds 23 from a pressing station to a blowing station and thence to a ware takeout station in succession. A parison mold 24 is located at the pressing station and is arranged for vertical reciprocation to and from contact with the neck molds 23 on the turret 22. The parison mold 24 is provided with side-by-side shaping cavities 25 and is mounted on a parison mold holder 26 attached to the upper end of a vertically disposed piston rod 27. The piston rod 27 is connected at its lower end to a piston 28 which is arranged for reciprocation in a vertical cylinder 29. Fluid for operating the piston 28 is supplied to the cylinder 29 through a pair of conduits 30 and 31 which are alternately connected to a suitable source of pressure fluid. A pair of glass pressing plungers 32 are mounted in a horizontal slideway 33 for lateral reciprocation into and out of alignment with the parison mold cavities 25 and are also arranged for vertical reciprocation to and from glass pressing relationship with respect to the parison mold 24. The details of this mechanism for operating the pressing plungers 32 do not form any part of this invention. Reference may be had to copending application Ser. No. 60,416, filed October 4, 1960, and assigned to the assignee of this application for the detailed description of the mechanism and its operation.

A split finishing mold 34 (shown open in FIG. 1) with cooperating bottom plates 35 are provided at the blowing station. A ware lowering device 36 and a hydraulic ware transfer device 37 are provided at the takeout station for positioning the finished ware on a continuously moving belt conveyor 38. The lowering device 36 is raised and lowered through the operation of a piston 39 mounted for reciprocation in a vertically positioned cylinder 40. Fluid under pressure is introduced to the cylinder 40 through the inlet conduits 41 and 42 in timed sequence with the operation of the other hydraulic mechanisms carried by the machine.

Thus it can readily be seen that the ware lowering device 36 is raised so that its upper surface is in contact with the bottom of the finished ware. The neck molds are opened to release the neck portion of the ware. After the ware is free from the neck molds, the device 36 is lowered by the introduction of fluid under pressure through the inlet conduit 41 while the fluid trapped below the piston 39 is exhausted through the conduit 42. In this manner the finished ware is lowered to the level of the conveyor 38 where it may be laterally transferred by the transfer device 37 to the conveyor 38.

The neck mold carrying turret 22 is arranged to be driven by a hydraulic drive unit 43 arranged upon the upper end of the drive shaft 21 and enclosed within the upper support structure 18. This driving unit, which does not form the novel part of the present invention, is specifically illustrated and described in a copending application 806,957, filed April 16, 1959, and reference may be had thereto for the full details of this drive mechanism.

Essentially this drive unit consists of a rotor fixed to the drive shaft 21 and enclosed in a rotor case. The rotor and case are arranged for successive intermittent rotation about the same axis and in the same direction therefore providing a mechanism which will index the turret 22 step-by-step and present the several sets of neck molds 27 successively to the successive stations, namely, the forming or pressing station, blowing station and the takeout station. The gob feeding and guiding elements of this machine include the shearing mechanism 12 and 13 adapted to simultaneously sever a pair of gobs 44 and drop them itno a multi-section guide system. The guide system consists of curved sections 45 which receive the gobs 44 as they are dropped and direct them to inclined sections 46 which will direct the gobs into the top end of a pair of vertically disposed gob guide sections 47 which will direct the gobs downwardly through the upper support structure 18. The guide sections 46 and 47 are permanently retained stationary in the position as shown in FIG. 1 and the curved sections 45 are normally mounted so as to be capable of movement into and out of alignment with the feeder orifices. When there are other machines being fed from the same feeder, these other machines will also carry reciprocating curved sections similar to 45 which are alternately positioned beneath the feeder orifices in timed sequence to the operation of their respective machines.

Figure 2:
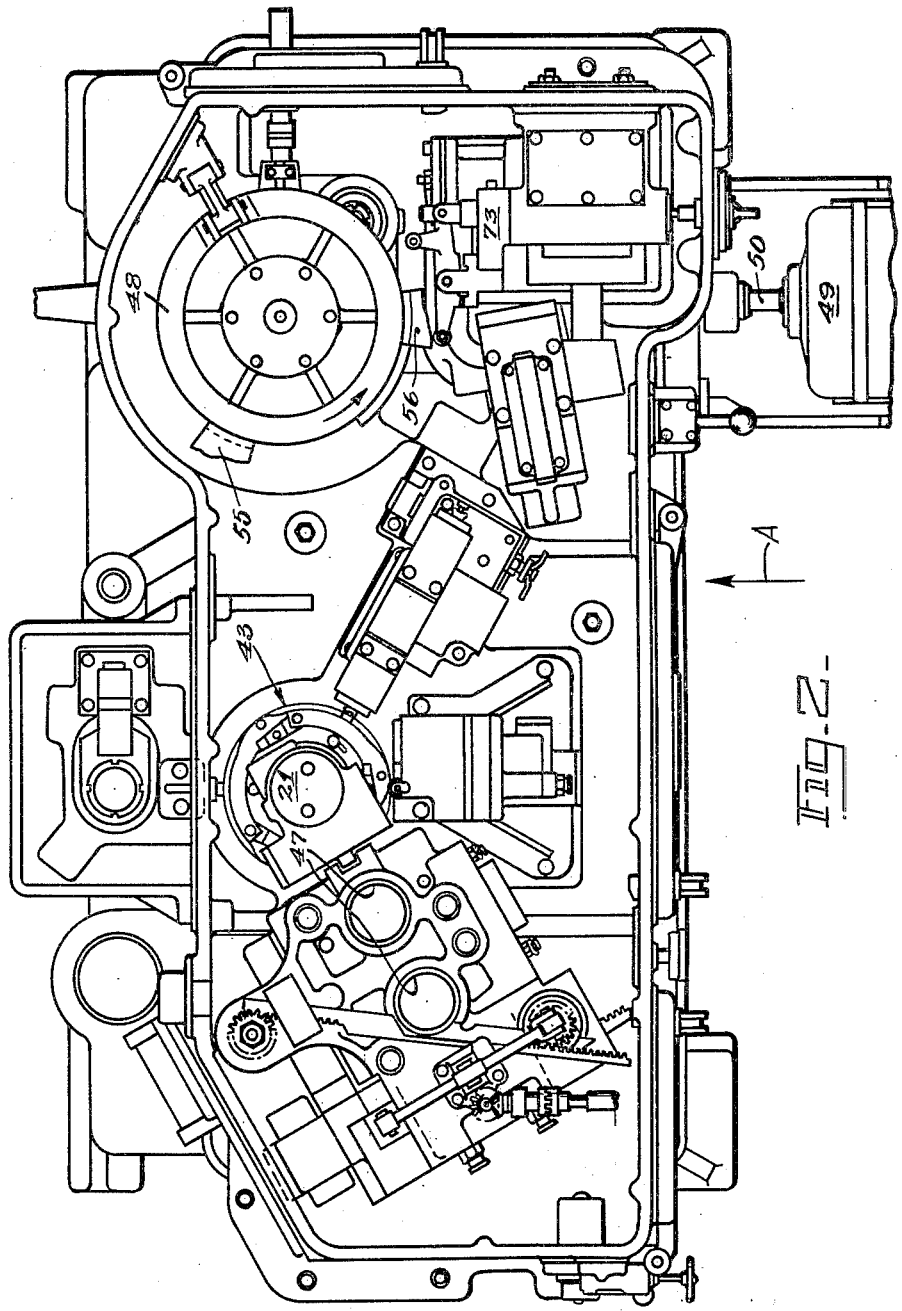
FIG. 2 is a schematic plan view, on an enlarged scale, of the machine unit taken at line 2—2 on FIG. 1.
Figure 3:
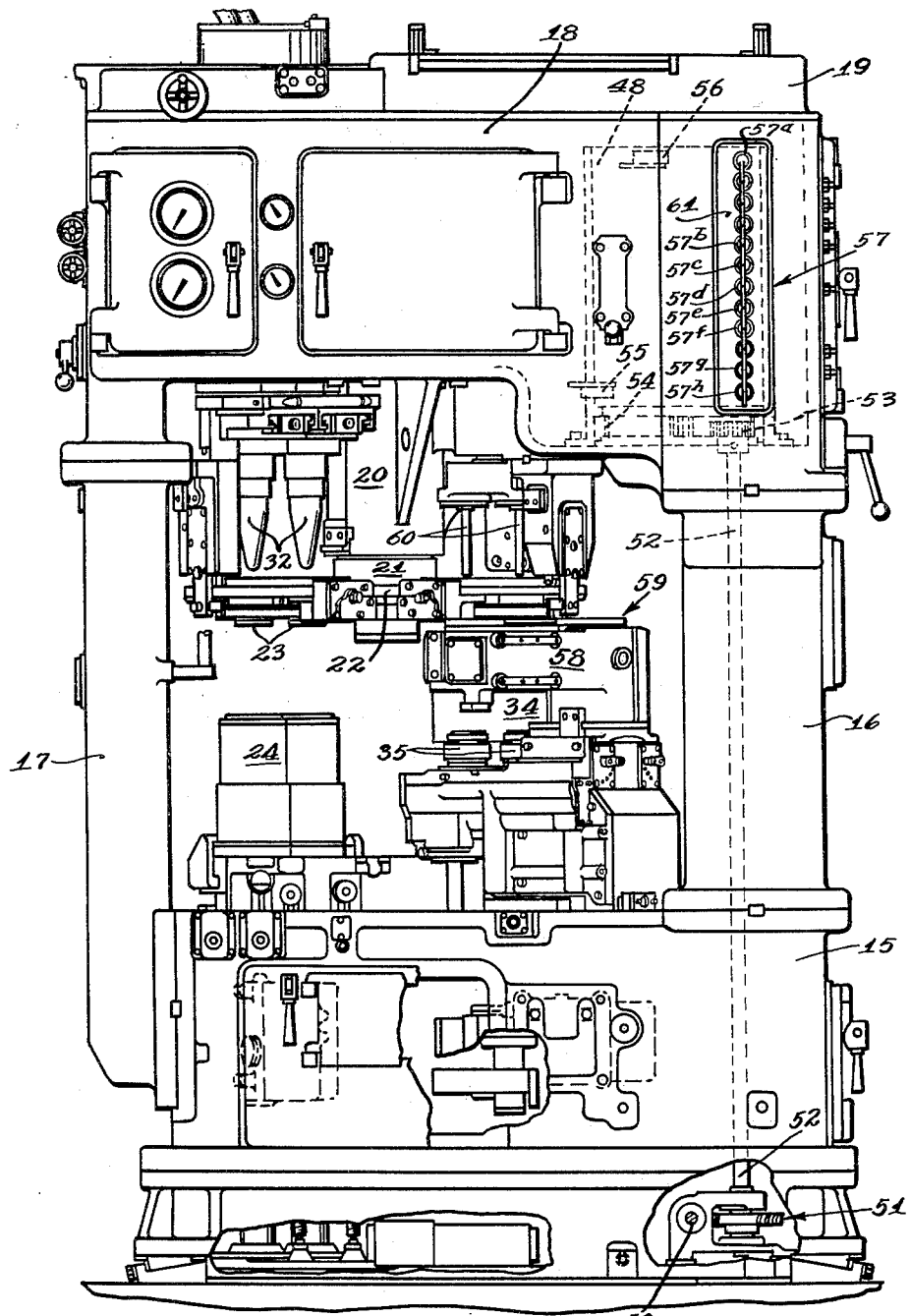
FIG. 3 is a schematic elevational view of the machine unit looking in the direction of arrow "A" on FIG. 2.

Referring now to FIGS. 2 and 3, there is shown a main cam drum 48 mounted for rotation about a vertical axis and housed within the upper support member 18. The cam drum 48 is driven by a motor 49 whose output shaft 50 is connected through suitable gearing 51 to a vertical drive shaft 52. The upper end of the vertical drive shaft 52 carries a pinion 53 which meshes with a ring gear 54 fixed to the inside of the drum 48 at its lower end. The drum 48 is provided on its outer cylindrical surface with a plurality of pairs of cam elements 55 and 56. Each pair of cam elements are individual to a specific valve actuator and the cams will successively operate the valve actuators as the drum is rotated to affect the rocking movement of the valve actuators. The drive motor 49 for the drum 48 is synchronized with the drive for the feeder 10 in the usual manner. While FIG. 2 shows only a single pair of cams, it should be pointed out that the cam drum 48 carries additional pairs of cams which operate valves for controlling the functions set forth on the control panel of FIG. 4.

The cam drum 48 carries a series of cams arranged to control the hydraulic actuation of various mechanical operations of the forming machine. These operations are initiated through a bank of valves 57a through 57h which are actuated in a predetermined order by the cams 55 and 56 which are individual thereto and which are spaced along the height and circumference of the cam drum 48. With respect to the parison blowing station, this station is disclosed in copending application Ser. No. 1,031, filed January 7, 1960, and owned by the assignee of this application. Therefore, only a brief description of the parison blowing mechanism will be given.

The parison blowing station is comprised of a pair of mold arms 58 arranged to fulcrum about a vertical pivot 59 for the opening and closing movements thereof. When the neck molds 23 are brought by the turret 22 to the blowing station, they carry a pair of parisons and will position the parisons between the mold arms 58 and the blow molds 34, and above the mold bottom plates 35. At this time the parisons will be enclosed in the blow molds with the mold arms 58 locked in the closed position. The opening and closing operation of the mold arms are initiated under the control of the main cam drum 48 and the valve 57g of valve bank 57. A pair of blowing nozzles 60 will then be projected downwardly into each of the hollow parisons by means of a hydraulic mechanism positioned above the nozzles 60. The blowing mechanism is under the control of the same cam actuated valve 57g, it being understood that the actuation of the blow nozzles is sequenced from the same cam operated valve which controls the opening and closing of the blow mold arms 58. When the blow head nozzles 60 are in blowing position, air is admitted through the nozzles into the inside of each parison conforming the same to the walls of the cavities of the blow molds 34. Upon completion of the blowing operation, the blow mold 34 is opened by shifting of the valve 57g to its opposite position leaving the blown ware W suspended from the turret 22.

At this time a cam on the drum 48 will actuate valve 57d of the valve bank 57 which will actuate the hydraulic drive 43 (FIG. 2) to thereby index the turret 22 moving the previously blown ware from the blowing station to the takeout station. At the same time, the indexing movement will bring a new pair of pressed parisons from the parison forming station to the blowing station preparatory to blowing a second pair of finished ware W. When the ware reaches the takeout station, a pair of dead plates which form a part of the lowering device 36 will be moved upwardly to a position approximately in contact with the bottoms of the ware suspended from the neck molds 23.

The positioning of the dead plates is under the control of the hydraulic cylinder 40 which in turn is controlled in its actuation by the valve 57f. Simultaneous with the positioning of the lowering device 36 with its dead plates in approximate contact with the ware W, a valve 57c will be actuated by its cam on the cam drum 48 to open the neck molds 23 and release the ware W to the lowering device 36. The cam drum 48 will then present a cam to the valve 57f to thereby cause the lowering device 36 to move downwardly bringing the ware to a position level with the conveyor 38 where it will be moved horizontally from the lowering device 36 onto the conveyor by the pusher mechanism 37.

Figure 4:
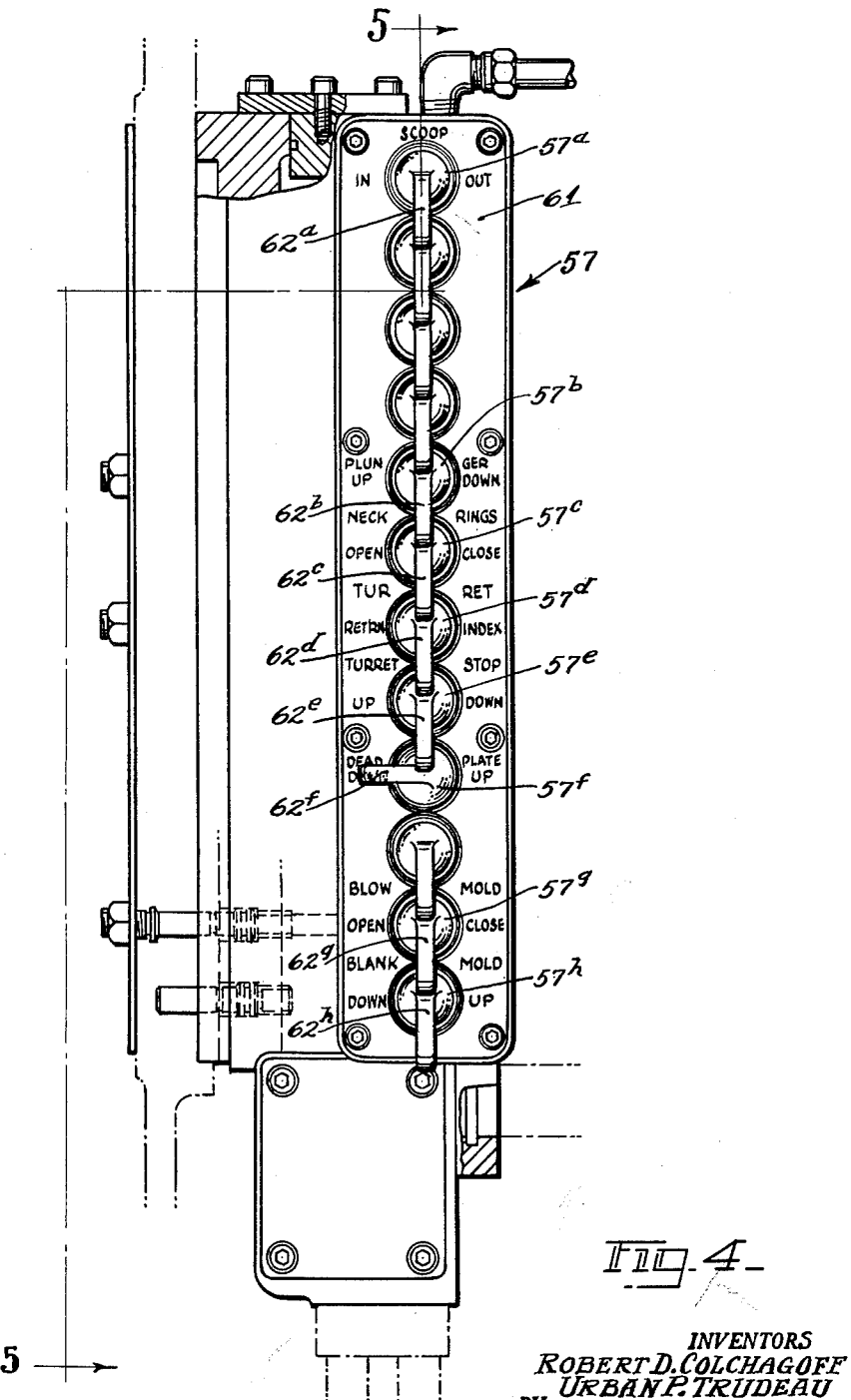
FIG. 4 is a partial elevational view on an enlarged scale of the control panel of the machine.

With particular reference to FIGS. 4 and 5, and as stated above, there are provided a plurality of valves 57a to 57h which are utilized in this forming machine for controlling those operations which are listed on a panel plate 61 fixed to the side wall portion of the upper support structure 18. Each control valve 57a to 57h is provided with a handle portion 62a to 62h. The handles are adapted to rotate coupling shafts 63 which are mounted for rotation within the upper support structure 18. Above each shaft 63 and slidably received within openings in the structure 18 are spring biased detents 64 which are adapted to cooperate with recesses 65 provided in the panel facing surface of the handles 62. Each valve handle 62 has three recesses whereby turning of the handle 90° in either direction from the position shown in FIGS. 4 and 5 will allow the detent 64 to fall into one of the three recesses. The detent prevents accidental movement of the handles during the operation of the machine.

Referring now to FIGS. 5–9, the shafts 63 have square shank portions 66 opposite the end which is retained in the handles 62. This shank portion 66 is received within a square opening 67 provided in one end of the valve spools 68 forming a part of the main control valves 57. The valve spools 68 have a central land portion 69 and two relieved portions 70 and 71. The valve spools 68 are adapted to slide within sleeves 72 which are retained within openings in a main valve block 73. The main valve block 73 has a plurality of horizontal sleeves 72 therein positioned one above the other and corresponding in number to the number of valves 57. Each sleeve 72 has five annular grooves which communicate with the interior thereof. The main valve block 73 is provided with three vertical chambers 74 and 75, with the central chamber 75 being connected to a suitable source of oil under pressure. The chambers 74 which serve as exhaust chambers, are provided with passageways which connect the chambers to each sleeve 72.

With particular reference to FIGS. 6–9, wherein a single valve 57f is shown in detail, the sleeve 72 which is fixed within the main valve block 73 has its outer two annular grooves in communication with the two exhaust chambers 74. The inner groove communicates with the pressure chamber 75. The other two intermediate grooves are connected to outlet passages 76 and 77 which connect with the fluid motor 40 which is connected to the ware lowering or dead plate mechanism 36. With the spool 69 in the position shown in FIG. 6, oil under pressure within the chamber 75 will flow by the relief portion 70 of the spool and out through the passage 76 while at the same time the passage 77 will be in communication with the exhaust chamber 74 due to the relief portion 71 of the spool. For purposes of illustration the outlet passage 76 is shown connected to conduit 41 which is connected to the cylinder 40 which serves as the motor for raising and lowering the dead plate mechanism 36. The other outlet passage 77 is connected to the conduit 42 which communicates with the opposite end of the cylinder 40. Thus it can be seen that when the valve is positioned as shown in FIG. 6, the piston 39 will be forced to the position shown on FIGS. 1 and 6 and any oil which has been trapped in back of the piston will flow out through the passage 42 to the exhaust chamber 74. The rate at which this oil will be exhausted may be controlled by the setting of an adjustable throttle valve 74a. Inasmuch as the operation of the motor 39, 40 is cyclic, it is necessary that the valve spool 68 be shifted to the left as viewed in FIG. 6 in order to reverse the operation of the motor 39.

The mechanism for shifting the valve takes the form of a valve actuator 78 which is pivotally supported near its center on a vertically extending rod 79. The actuator has a pair of cam contacting rollers 80 and 81. The cam roller 81 is connected to the valve actuator 78, at one end thereof and slightly above the top surface thereof. On the opposite side of the pivot 79, the other roller 80 is connected thereto and extends slightly below the bottom surface of the actuator 78.

As shown in FIG. 6, the cam 56 is in contact with the roller 80 and has forced the actuator 78 against the stop 82 which will limit its rotation in a counter-clockwise direction. Continued rotation of the drum 48 in the direction of the arrow shown thereon will result in the cam 55 coming in contact with the roller 81 and will result in rocking the cam actuator 78 in a clockwise direction where the actuator will abut a second stop 83. The end of the actuator opposite the roller 81 is bifurcated and adapted to carry within its opening a vertically extending pin 84 which is connected to an axially shiftable sleeve coupling member 85. The sleeve member 85 is provided at its opposite end with an axial opening therein within which a stem portion 86 of the spool 68 is adapted to be received. In order to insure that the movement of the sleeve member 85, relative to the stem portion 86 of the valve spool 68 is not damped by trapped air, a vent passage 87a connects the axial opening therein to atmosphere (FIGS. 7 and 8). The outer end of the stem portion 86 is provided with a radially extending pin 87, which, during the normal operation of the valve actuator 78, will serve as a coupling means between the sleeve member 85 and the spool 68. The sleeve member 85 is provided with a cutout portion 88 which is generally Z-shaped when viewed from the side in its normal position as seen in FIGS. 5 and 7.

With the valve handle 62 pointing downward as viewed in FIGS. 4 and 5, the pin 87 will be positioned in the center portion of the Z-shaped slot and therefore will serve as a direct motion coupling member between the spool 68 and its actuator 78. When the valve handle 62 is turned, for example, in a clockwise direction, as shown in FIG. 6, the spool 68 and stem portion 86 along with the radially extending pin 87, will be turned 90° and the pin will fall into the top portion of the Z-shaped slot 88. Thus when the pin 87 is positioned in a horizontal or axially extending portion of the slot 88, the coupling sleeve member 85 will be reciprocated by the actuator 78, but the pin 87, since it is free to slide in the slot, will not transmit any motion to the spool 68. The spool 68 will remain in the position shown and the lowering mechanism 36 will be maintained in its down position while the rest of the machine may operate in its normal cycle.

In order to return the pin 87 to the vertical portion of the slot 88, it is only necessary to wait until the cam 55 has contacted the roller 81 and shifted the coupling sleeve member 85 to the right as viewed in FIG. 6, at which time the handle 62 may be turned and the pin 87 will fall into the vertical or circumferential portion of the slot 88. Continued rotation of the handle beyond 90° will position the pin 87 into the other horizontal or axial portion of the slot 88 and upon actuation by the cam 56, the valve spool 68 will be moved to the left and remain in this position due to the fact that the pin 87 will be free to move in the horizontal portion of slot 88.

While the above description has been primarily concerned with the valve 57f which controls the raising and lowering of the mechanism 36, it should be pointed out that there are a series of these valves which are controlled in the same manner as described above with respect to the particular valve shown in FIG. 6.

Each of these valves may be shifted in a like manner so as to deactivate certain parts of the machine either for repair purposes or for close examination without disturbing the operations of the other parts of the machine. Obviously it would be necessary to divert the gobs of glass away from the machine when the machine is no longer making bottles or when a portion of the machine is being shut down in a non-glass handling position. Therefore, the valve 57a would normally be turned counter-clockwise to position the guide scoops 45 out of registry with the gobs 44. Then, if, for example, it were necessary to change the blank molds, the valve 57h may be turned clockwise thus leaving the blank molds down while the rest of the machine and its cam drum 48 may continue to rotate and gobs may be continuously severed. In this manner it is possible to make changes on the forming machine without disturbing the synchronism between the machine and the feeder and it is possible to check alignment on the various parts of the machine which cooperate, for example, with the neck molds.

Applicants' invention has a further distinct advantage during the starting up period of the forming machine. It is a well-known fact that forming machines of the type disclosed herein require a warming up period so that the parison molds may reach a stable temperature. During this warming up period, the parisons, which are formed in the blank molds, frequently are unsuitable for being blown into finished ware and if the blow molds are operated in the normal manner there is the probability that pieces of glass will flake off the parison when it is expanded. This flaking off presents a cleaning problem and can be avoided if the machine is started up and run without operating the blowing station and the machine operator removes the parisons at the takeout station by hand. Thus with the present invention the machine may be started and operated in its normal manner but with the blow molds left open and the dead plate maintained down until the warm up period has been completed and then merely by turning the handles 62g and 62f, the blow molds will be put into operation in sequence with the other operating parts of the machine and the dead plate mechanism will begin operating in its proper timed sequence.

Thus it can be seen that applicants have provided a control system for a glass forming machine which will allow selected portions of the machine to be put out of operation while allowing the rest of the machine to operate undisturbed.

Various modifications may be resorted to within the spirit and scope of the appended claims.

We claim:

1. In a glass forming machine of the type having a plurality of fluid motors for effecting the operation of moveable mechanisms of the machine, the improvement comprising a rotatable drum, means for rotating said drum at a constant speed, a plurality of cams carried by said drum, a valve block mounted adjacent to said drum, a plurality of spool valves extending through said valve block with their ends describing a line parallel to the surface of said drum, a plurality of valve actuators pivotally mounted on said valve block, each actuator having a pair of cam contacting members thereon, one on each side of said pivot, means for selectively coupling one end of each actuator to an individual spool valve at one end thereof, said coupling means being adjustable by rotation of said spool valves, and means connected to the other end of said valves for effecting rotation thereof.

2. Apparatus for controlling the sequence of operation of a glass forming machine, comprising a rotatably driven drum, a plurality of cams carried by said drum, a bank of axially shiftable spool valves, a plurality of pivotally mounted actuators individual to said valves and positioned in the path of selective sets of said cams, each valve in said bank being shiftable between two extreme positions by said actuators during a normal operating cycle, means for coupling said valves to their actuators, each coupling means comprising a slotted sleeve member, means connecting one end of said sleeve member to an actuator, a radially extending pin adjacent one end of said valve, said one end of said valve extending within the slotted sleeve member, and said pin engaging said slot, whereby reciprocation of said sleeve will cause reciprocation of said valve.

3. In a glass forming machine of the type having a plurality of fluid motors for effecting the operation of moveable mechanisms of the machine, the improvement comprising a rotatable drum, means for rotating said drum at a constant speed, a plurality of cams carried by said drum, a valve block mounted adjacent to said drum, a plurality of axially shiftable spool valves extending through said valve block with their ends describing a line parallel to the surface of said drum, a plurality of valve actuators pivotally mounted on said valve block, each actuator having a pair of cam contacting members thereon, one on each side of said pivot, means coupling one end of each actuator to an individual spool valve at one end thereof, said coupling means being adjustable by rotation of said spool valves, whereby said spool valves are axially shiftable between two positions, and means connected to the other end of said valves for effecting rotation thereof.

4. In a glassware forming machine having a plurality of reciprocally actuated fluid motors, the combination of a rotatable drum, radially extending cams carried by said drum, a valve block mounted adjacent to said drum, a plurality of vertically spaced spool valves within said valve block, a plurality of levers pivotally mounted on said valve block for rocking movement by engagement with said cams, means connecting said levers to individual spool valves at one end thereof, a plurality of sleeves connected at one end to an individual lever and axially receiving one end of a spool valve within an opening therein, a radially extending pin connected to said one end of said spool valve, a slot formed in said sleeve within which said pin is adapted to ride, said slot having two oppositely extending axial portions joined by a circumferential portion whereby rotation of said spool valve may selectively place said pin in any of the three portions of said slot.

5. In a glass forming machine having a plurality of fluid actuated reciprocating motors operable to supply motive power to moveable mechanisms of the machine comprising a chambered valve block, a supply of fluid under pressure within one chamber of said block, a plurality of pairs of conduits extending from said block with a pair connected to each motor, a plurality of spool valves extending through said block, each spool valve being axially shiftable between two positions for effecting the connection of said fluid pressure to said conduits alternately, a timing drum mounted adjacent said valve block for rotation at a predetermined speed, said drum having a plurality of cam elements extending from the surface thereof, a plurality of actuators mounted on said valve block and individual to each valve, each actuator being engaged by selective cam elements on said drum during rotation of said drum and having one end moved toward and away from its valve spool, means for coupling said one end of each actuator to its individual valve for reciprocating said valve in predetermined sequence, means for selectively changing said coupling means so that any valve will be moved by its actuator to either of its two positions, in sequence, and remain in this position until said coupling means is returned to its original relationship, whereby individual ones of said motors may be selectively operated in either direction and held in either of its reciprocated positions in sequence with its normal operation to that position when the timing drum operates its valve actuator in its regular sequence.

6. In a glass forming machine having a plurality of fluid actuated reciprocating motors operable to supply motive power to moveable mechanisms of the machine comprising a chambered valve block, a supply of fluid under pressure within one chamber of said block, a plurality of pairs of conduits extending from said block with a pair connected to each motor, a plurality of spool valves extending through said block, each spool valve being axially shiftable between two positions for effecting the connection of said fluid pressure to said conduits alternately, a timing drum mounted adjacent said valve block for rotation at a predetermined speed, said drum having a plurality of cam elements extending from the surface thereof, a plurality of actuators mounted on said valve block and individual to each valve, each actuator being engaged by selective cam elements on said drum during rotation of said drum and having one end moved toward and away from its valve spool, a coupling between each actuator and the valve having engageable elements, one element being reciprocated by said actuator, the other element connected to said valve, control means for selectively engaging said elements alternatively to reciprocate said valve by the actuator in regular sequence, thereby regulating one of said motors, or drive the valve by its actuator in one direction only to one of said positions, thereby holding said hydraulic motor in a preselected position.

7. In a glass forming machine having a plurality of fluid actuated reciprocating motors operable to supply motive power to moveable mechanisms of the machine, comprising a chambered valve block, a supply of fluid under pressure within one chamber of said block, a plurality of pairs of conduits extending from said block with a pair connected to each motor, a plurality of spool valves extending through said block, each spool valve being axially shiftable to effect the connection of said fluid pressure to said conduits alternately, means for reciprocating said valves in sequence including a drum having a plurality of cams thereon with means for rotating said drum at a constant speed and means mounted in the path of said cams for reciprocation thereby, means connecting said valves to said means for reciprocating same including a radially extending pin adjacent one end of said valve, a slotted sleeve member within which said valve end is adapted to slide, said pin engaging said slot, whereby reciprocation of said sleeve will result in reciprocation of said valve spool, and means for adjusting said connecting means whereby said valves may be selectively and individually positioned in either of their two positions and said motors selectively maintained in either of their reciprocated positions or reciprocated each cycle of the machine.

8. In a glass forming machine having a plurality of fluid actuated reciprocating motors operable to supply motive power to moveable mechanisms of the machine, comprising a chambered valve block, a supply of fluid under pressure within one chamber of said block, a plurality of pairs of conduits extending from said block with a pair connected to each motor, a plurality of spool valves extending through said block, each spool valve being axially shiftable to effect the connection of said fluid pressure to said conduits alternately, means for reciprocating said valves in sequence, means connecting said valves to said means for reciprocating the same including a radially extending pin adjacent one end of said valve, a sleeve member having an axial opening therein adapted to receive said one end of said valve, a slot formed in the sidewall of said sleeve within which said pin is adapted to ride, means for adjusting said connecting means comprising said slot having two axial portions joined by a radial portion and means connected to said valve for rotating said valve to selectively position said pin in one of said three portions whereby said valves may be selectively and individually positioned in either of their two positions and said motors selectively maintained in either of ther reciprocated positions or reciprocated each cycle of the machine.

References Cited in the file of this patent

UNITED STATES PATENTS

| | | |
|---|---|---|
| 2,041,517 | Rule | May 19, 1936 |
| 2,667,146 | Wheeler | Jan. 26, 1954 |
| 2,871,882 | Eliasson | Feb. 3, 1959 |
| 2,877,627 | Jorgensen | Mar. 17, 1959 |